March 17, 1936.  G. S. BALDWIN  2,034,456
PRESS CONTROL MECHANISM
Filed March 28, 1934  6 Sheets-Sheet 1

INVENTOR
GEORGE S. BALDWIN
BY
ATTORNEYS

*INVENTOR*
GEORGE S. BALDWIN
*ATTORNEYS*

March 17, 1936.  G. S. BALDWIN  2,034,456
PRESS CONTROL MECHANISM
Filed March 28, 1934  6 Sheets-Sheet 4

FIG. -13

INVENTOR
GEORGE S. BALDWIN
BY
Brockett, Hyde, Higley + Meyer
ATTORNEYS

FIG.-14

Patented Mar. 17, 1936

2,034,456

UNITED STATES PATENT OFFICE 2,034,456

PRESS CONTROL MECHANISM

George S. Baldwin, Cleveland Heights, Ohio, assignor to The American Laundry Machinery Company, Norwood, Ohio, a corporation of Ohio Application March 28, 1934, Serial No. 717,870

16 Claims. (Cl. 68—9)

This invention relates to a control mechanism for a plurality of power operated machines and more particularly to a control for tandem or cross operation of two machines wherein a closing operation takes place at one machine simultaneously with an opening operation at the other machine.

This invention is illustrated herewith in connection with two presses of the type generally used in laundry or garment work and an object of the invention is to provide a power distributing member for controlling the application of power alternately to press-opening and press-closing mechanism at two machines and arranged so that the power is supplied simultaneously to the press-closing mechanism of one machine and the press-opening mechanism of a second machine.

Another object of the invention is to arrange a control for two machines whereby they are continuously kept in step, that is to say, regardless of the speed of the operator in working at either machine, both machines will remain in phase with one machine open or ready to open when the other machine is closed or ready to close.

Another object of the invention is to provide improved means for timing the period of operation of a machine, in this embodiment, the period during which a pressing machine is closed.

A further object of the invention is to provide a tandem control mechanism for two machines as above described, together with means for preventing injury to the operator due to premature closing of the machine upon which she is engaged, and safety mechanism for insuring opening of the machines under all circumstances in time to prevent injury to pressing members or materials in process.

Other objects and advantages will be apparent from the accompanying drawings together with the description, and the essential features will be summarized in the claims.

In the drawings, Fig. 14 is the electrical equivalent of the fluid operated system of Fig. 13; while

While the invention in some of its broader aspects is applicable to many types of machines using electrical or fluid pressure power means, I have chosen to illustrate the control mechanism as applied to fluid pressure operated presses of the type illustrated, described and claimed in the copending application of Angus F. Hanney, Ser. No. 721,259, filed April 19, 1934, showing a press suitable for use in garment and laundry work.

My invention comprises in general a commutator or power distributing member in combination with two presses and designed to supply power to opening mechanism of one press and closing mechanism of another press simultaneously. Each press has a control member having two positions, one position controlling press closing and the other position controlling press opening. The power distributing mechanism is so arranged as to normally supply power to the two machines in opposite phase, that is to say, with one press in position to close and the other press in position to open. The distributing mechanism is preferably arranged to stop if both presses are in the same phase, that is to say, both open or both in position to close. By this arrangement it is assured that the operator will at all times keep the machines in step and if she is delayed at one machine beyond the normal period both machines will be open, and the power distributing mechanism will stop and will not continue until she has moved the control member of that machine at which she is working to press-closing position. The power distributing mechanism, in its normal operation, will open each press a predetermined time after its closing. In addition, each press is supplied with an emergency timing mechanism to open the same after a predetermined time which will be somewhat greater than the normal period determined by the setting of the power distributing means. This emergency timer mechanism serves largely as a safety arrangement to prevent either press remaining closed for a period long enough to cause damage to the press padding or to work lying thereupon.

While my invention does not depend upon the use of any particular form of power means, I have chosen to illustrate two presses opened and closed by fluid power while using electrical power for the interconnecting of the control members of two machines to insure the maintaining of the machines in opposite phase, this same electrical power being used in the driving mechanism of the power distributing means. The control mechanism of each press is most clearly seen in Figs. 3 and 4, together with the general views of Figs. 1 and 2 and sufficient description will be given here to understand the operation of the press, reference being had to the above mentioned copending application for further details if desired.

Each press comprises in general, frame members 20 supporting a pressing head 21 and having rails 22 upon which moves a carriage 23 into and out of registration with the head. On the carriage is a bed member 24 supported for vertical movement relative to the carriage from which it is raised by contact from beneath against a downwardly extending pressure pin 25. A cylinder and piston motor 26 is supplied for moving the bed into registering position and raising the bed from the carriage into pressure engagement with the head. A piston 27 moves vertically in the cylinder 28 which lifts the piston rod 29 together with a yoke or saddle member 30 which is secured to the piston rod. The saddle member in turn is pivoted to a cam lever 31 by a connection 32, the lever being pivoted to the frame at 33. The free end of the cam lever has an active portion 34 and a dwell portion 35 adapted to engage a follower 36 on a carriage-moving lever 37 which is pivoted to the frame at 38. A link 39 connects the carriage-moving lever to the carriage. Movement of the piston upwardly in its cylinder causes clockwise movement of cam lever 31 which for the first portion of the movement of the cam lever actuates the carriage-moving lever in a counterclockwise direction until the bed is in registration with the head and thereafter the dwell portion 35 of the cam lever holds the bed in registering position while further movement upwardly of the piston rod 29 carries a boss 40 into contact with pressure pin 25 and raises the bed into pressing engagement with the head. Upon release of pressure in cylinder 28 the piston rod and saddle move downward due to the weight of the parts and spring 41 swings lever 37 and the bed to forward or open position. 42 indicates a snubber for the horizontal motion of the bed.

Figure 1:
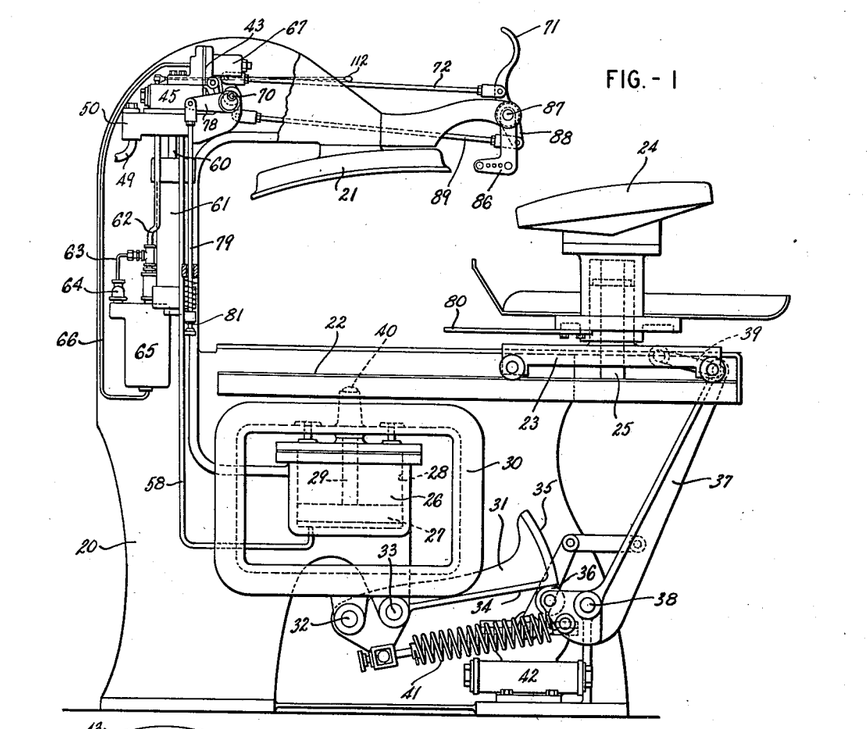
Fig. 1 is a side elevation of a press embodying my invention with the pressing bed in open position.
Figure 2:
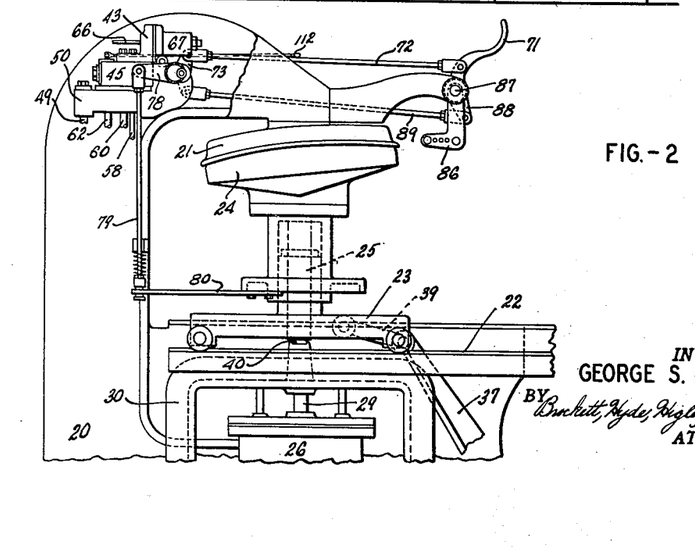
Fig. 2 is a partial view similar to Fig. 1 showing the bed in pressing engagement with the head.

The control valves for the supply and exhaust of fluid pressure to the cylinder and piston motor 26 are grouped in a common valve block indicated in general at 43 in Figs. 1 and 2. The arrangement of these valves is more clearly seen in Figs. 3 and 4 where 44 indicates a primary inlet valve, 45 a secondary inlet valve or final pressure valve, 46 is an exhaust valve, while 47 is a power release cylinder for moving the valve controls to fluid pressure exhaust position, the control of fluid flow to the power cylinder being by way of pilot valve 48.

The valve block comprises an upper portion containing the valves proper and a lower portion through which are cored passageways for conducting fluid to and from the various valves. The main supply is by way of conduit 49, filter 50, and forwardly extending passageway 51 which communicates by way of passageway 52 with valve 44, by passageway 53 with valve 45, and by passageway 54 with valve 46. In passageway 52 is a valve 55 which is hereinafter designated the tandem valve. This valve is adjustable by the operator to the position of Fig. 3 or the position of Fig. 12. For the present description it will be assumed to occupy the position of Fig. 12. In passageway 52 a restricted orifice 56 may be provided for a purpose later disclosed. On their outlet sides valves 44 and 45 communicate with chamber 57 which also extends to communicate with one side of exhaust valve 46. Chamber 57 is connected by conduit 58 with motor 26. The outlet side of pilot valve 48 is connected by conduit 59 with release cylinder 47. The outlet side of exhaust valve 46 is connected by conduit 60 to a muffler 61.

Any suitable timer may be used to perform the functions here ascribed to the emergency timing mechanism. The form illustrated is that of the copending Hanney application mentioned above. When fluid is admitted to chamber 57, it flows by conduit 62, by-pass 63, controlled by adjustable needle-valve 64, to a reservoir 65. The reservoir communicates by conduit 66 with a fluid pressure actuated trip mechanism 67, biased in unoperated position by spring 68. Whenever a press is closed for a sufficient time to allow pressure in reservoir 65 and conduit 66 to overcome spring 68, the trip will be operated causing an arm 69 to engage the stem 48' of pilot valve 48, thus admitting pressure to release cylinder 47. Whenever the press opens, whether by the timer mechanism or otherwise, relief of pressure in chamber 57 permits opening of check valve 65' to evacuate reservoir 65 and conduit 66, so that the timer mechanism is ready for another cycle of its operation.

The various control valves are normally closed by springs and actuators for opening them lie upon a common cam shaft 70 which is supported in suitable bearings and is actuated in press-closing direction manually by means of a forward pull upon control handle 71 by the operator. Control handle 71 is connected with the cam shaft 70 by a link 72 and an arm 73 which is rigid with the cam shaft. A pull on the manual control will therefore move the arm 73 in a clockwise direction as se t in Figs. 6 to 11 and will cause cam 74 to engage the stem 44' of valve 44 thus opening the primary inlet valve.

The exhaust valve 46 is actuated by a cam 75 rigid on shaft 70 and so arranged in relation to cam 74 that when valve 44 is closed valve 46 is open and vice versa.

Figure 6:
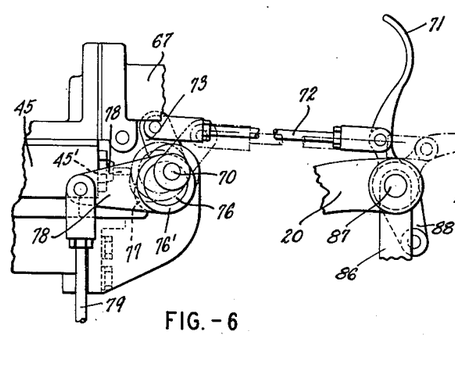
Fig. 6 is an enlarged view of the portion of the control mechanism shown in the upper portion of Fig. 1, the view of the valve mechanism being substantially along the line 6—6 of Fig. 3.
Figure 7:
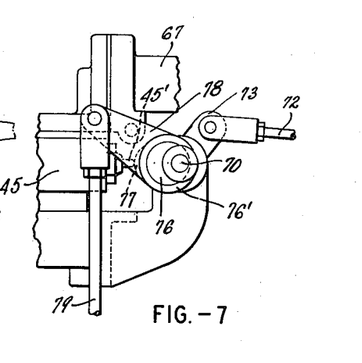
Figs. 7 to 11 inclusive are views along similarly numbered lines of Fig 3.

The final pressure inlet valve 45 is actuated by a two-step eccentric arrangement best seen in Figs. 6 and 7. An eccentric 76, rigidly secured to shaft 70, carries a sleeve 76'. Rigid with the sleeve is a cam 77 adapted to actuate stem 45' of valve 45. Also rigid with the sleeve is an arm 78 arranged to rotate the sleeve about the eccentric after the bed reaches registering position beneath the head. This arrangement comprises a rod 79 extending downwardly from arm 78 and guided loosely in a bracket on the frame. A bar 80 rigid with the bed 24 is notched at its free end to engage a shoulder 81 on rod 79 when the bed registers beneath the head. Then as the bed starts to move upward rod 79 is lifted, arm 78 and cam 77 rotate clockwise and valve 45 is opened.

Figure 3:
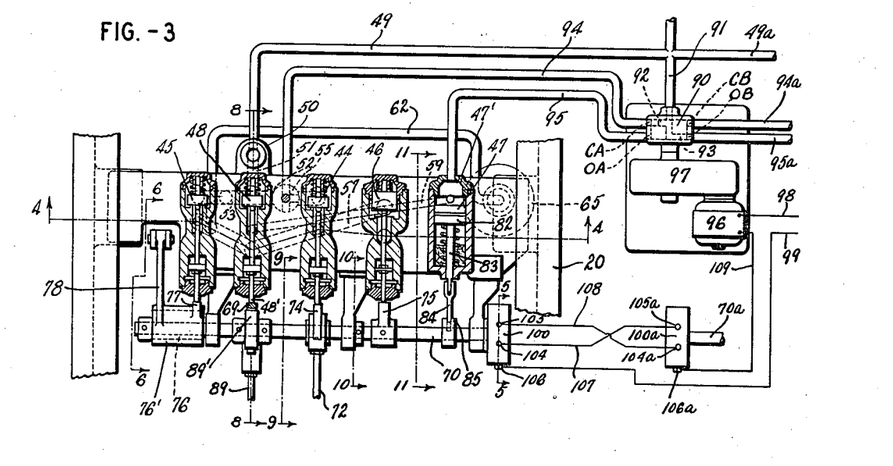
Fig. 3 is a plan view of the control valves, showing the valves in section and including a diagrammatic showing of the control mechanism for distribution of power to two machines.

Cam shaft 70 is rotated counterclockwise as seen in Figs. 6 to 11 to open the press. This is accomplished by release cylinder 47 mentioned above. The cylinder is provided with a piston 82 having a rod 83 connected by a link 84 with an arm 85 which is rigidly fastened to shaft 70. Travel of piston 82 may be limited by oil-saturated felt as shown in Fig. 3. Fluid admitted to cylinder 47 through passageway 59 will thus actuate cam shaft 70 in a counterclockwise direction which will rotate cams 74 and 75 and eccentric 76, closing inlet valves 44 and 45 and opening exhaust valve 46. Cylinder 47 is provided with a small vent 47' sufficient to evacuate the cylinder after a power stroke but not large enough to interfere with its proper operation.

Figure 8:
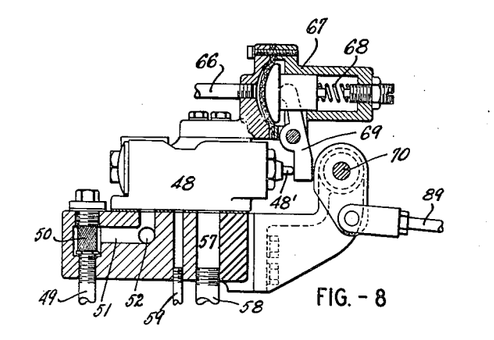
Figure 9:
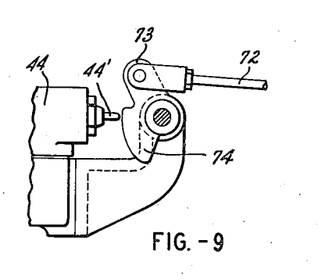
Figure 10:
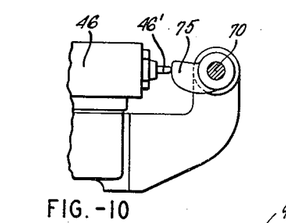
Figure 11:
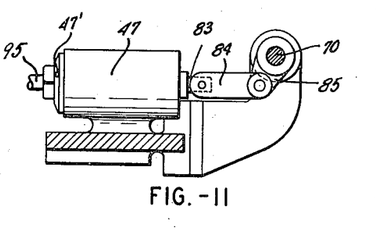

The supply of fluid to release cylinder 47 is controlled by pilot valve 48. This valve may be actuated by the emergency timer mechanism above described in connection with Fig. 8. Pilot valve 48 may also be actuated by a finger guard 86 which depends in a position in front of the head and closely above the path of travel of the pressing surface of the bed. The guard is freely swingable in a clockwise direction about shaft 87. An arm 88 on shaft 87 is arranged to turn when the guard moves and is connected by a rod 89 with a cam member 89' which is freely rotatable on shaft 70. As seen in Fig. 8, rearward movement of rod 89 will rotate cam 89' clockwise and depress stem 48' of valve 48 thus admitting fluid pressure to the release cylinder. The finger guard thus is available to open the press at the will of the operator regardless of any timing mechanism, and will always open the press if the operator's hands are lying upon the bed as it moves toward registering position.

Operation of a single press is as follows: With the parts in the position of Fig. 1, the operator arranges work on bed 24 and pulls control handle 71 toward her. Exhaust valve 46 closes, primary inlet valve 44 opens and pressure flows through conduit 49, passageways 51 and 52, valve 55, restricted orifice 56, valve 44, chamber 57 and conduit 58 to piston motor 26. Through the operative connections described bed 24 moves at a rate controlled by orifice 56 until it registers with head 21. Bar 80 engages rod 79, and as the bed starts up this interlocking arrangement opens final inlet valve 45 and the bed moves rapidly into pressing engagement with the head, as shown in Fig. 2. After a lapse of time corresponding to the period of the emergency timer mechanism, or otherwise by the operator moving guard 86, pilot valve 48 is opened. Fluid then passes through conduit 59 to release cylinder 47, piston 82 moves toward shaft 70 and rotates the shaft to close valves 44 and 45, at the same time opening exhaust valve 46. Motor 26 is then evacuated and the bed returns to forward or open position for another cycle of operations.

Figures 4, 5:
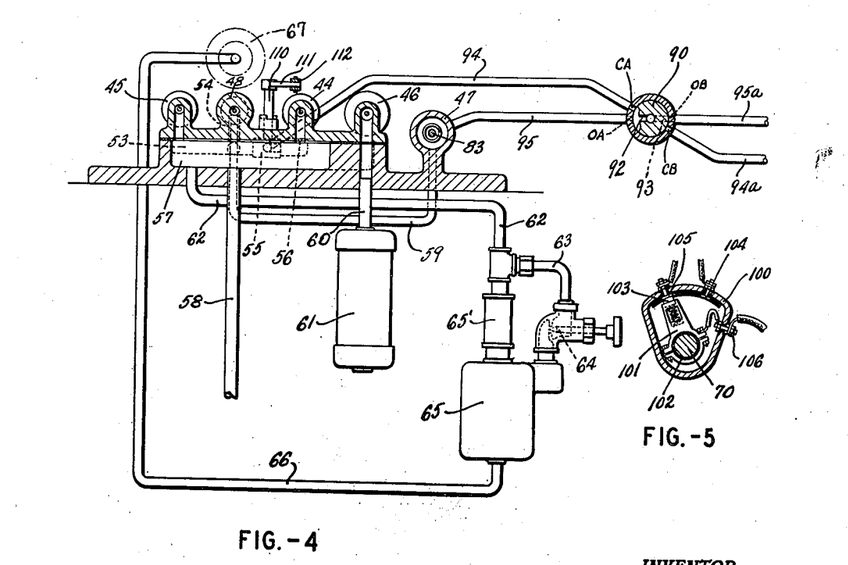
Fig. 4 is a sectional view along the line 4—4 of Fig. 3 and including diagrammatically a part of the control mechanism for the distribution of power to a second machine.
Fig. 5 is a view along the line 5—5 of Fig. 3.

In connecting up two presses for tandem operation, I provide a power distributing member arranged to supply power simultaneously to the press-opening mechanism of one press and to the press-closing mechanism of another press. The present embodiment comprises a rotary valve 90, the construction of which is best seen in Figs. 3 and 4. The form here shown is illustrative only, it being desired that passageways be provided in the valve for simultaneously distributing fluid pressure through one set of conduits to one machine and through a second set of conduits to a second machine. In the form shown, fluid pressure enters the valve centrally thereof through conduit 91 and is distributed through oppositely extending radial passageways 92 and 93 spaced longitudinally of the axis of the rotary valve. The passageway 92 through port CA supplies conduit 94 which leads to the inlet valve or press-closing mechanism of the first press and through port CD supplies conduit 94a which leads to the press-closing mechanism of a second press. Valve passageway 93 through port OA supplies fluid pressure to conduit 95 leading to the release fluid pressure to conduit 95 leading to the release or press-opening mechanism of the first press and through port OB supplies conduit 95A leading to the release mechanism of the second press. The rotary valve is thus arranged to supply fluid pressure simultaneously to ports CA and OB, or to ports OA and CB. The passageway 92 may extend around a portion of the circumference of the rotary valve as shown in Fig. 4 for a purpose later described.

Valve 90 is rotated by electric motor 96 preferably through reduction gearing 97. The supply of electric current for the motor 96 is by way of lines 98 and 99 connected with a suitable source. In one of these lines, as for instance 99, switch mechanism is supplied arranged so that synchronizing members on the two machines must be in opposite phases, that is, one in press-open and one in press-closed position, to supply electric power to the motor 96. In the present instance valve controlling cam shafts 70 and 70a are used for synchronizing purposes. To this end each shaft is supplied with a switch member 100 which comprises a contact carrying arm 101 rigidly clamped upon the end of shaft 70 and preferably insulated therefrom by insulation 102 and carrying a contact 103 adapted to make contact with press-closing contact 104 or press-opening contact 105. Contact 103 is electrically connected to binding post 106. Like switch members for a second press are shown diagrammatically in Fig. 3 and are marked with similar reference characters having the suffix "a". Contact 104 is connected by line 107 with contact 105a. Contact 105 is connected by line 108 with contact 104a. Binding post 106 is connected with line 99, while binding post 106a is connected by line 109 with one of the terminals of motor 96. If cam shaft 70 is in press-closing position and shaft 70a in press-opening position, current is supplied to motor 96 by the circuit 99—106—103—104—107—105a—103a—106a—109. If shaft 70 is in press-opening position and shaft 70a in press-closing position, current is supplied to motor 96 by the circuit 99—106—103—105—108—104a—103a—106a—109. If both cam shafts are in press-closing position, or both in press-opening position, no current is supplied and motor 96 stops.

Figure 12:
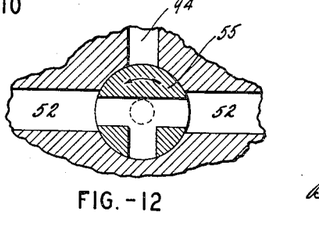
Fig. 12 is an enlarged view of one of the valves of Fig. 3.
Figure 15:
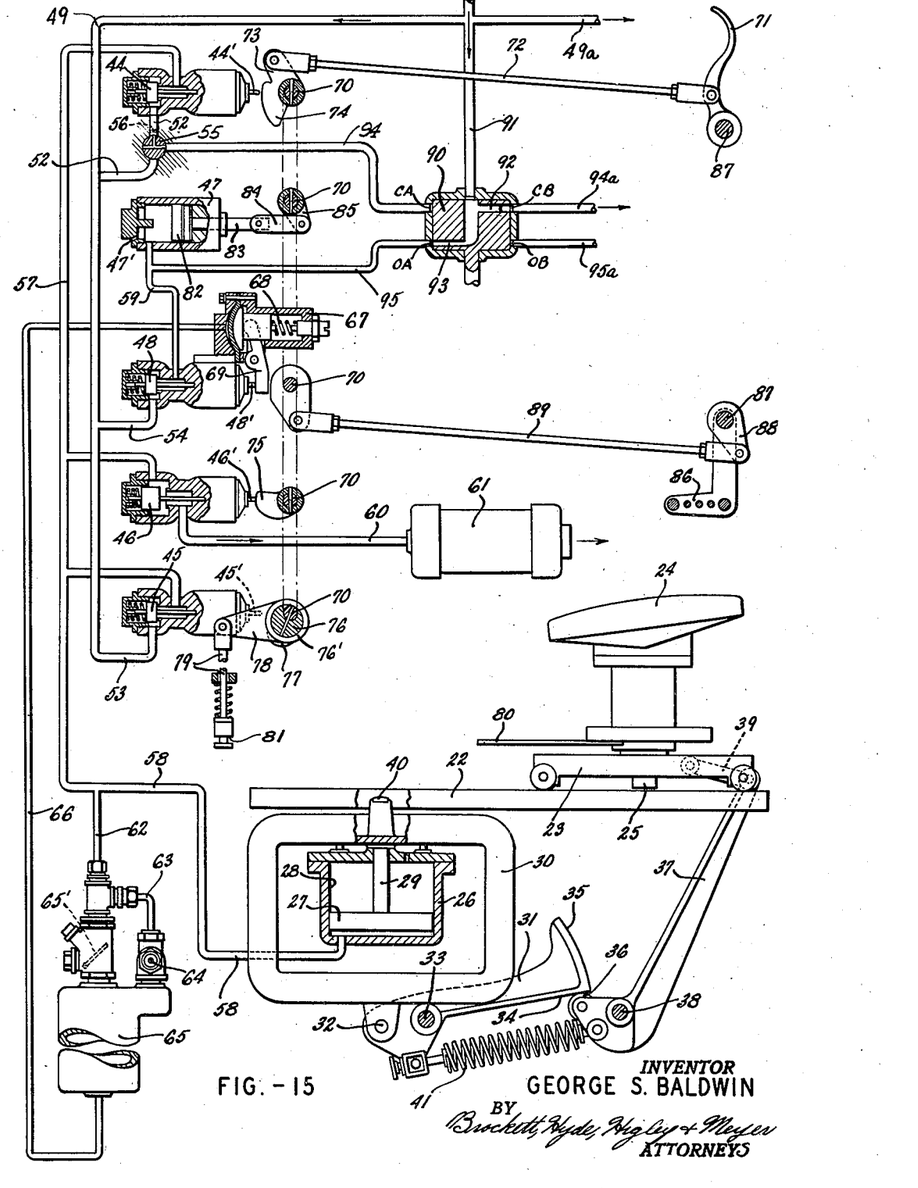
Fig. 15 is a schematic layout of the fluid system of the machine of Figs. 1–12.

For tandem operation valve 55 is rotated 90° from the position of Fig. 12 to the position of Figs. 3 and 15. For this purpose valve 55 may be provided with an upstanding stem 110, which is rotatable by an arm 111, through an actuating connection 112 placed conveniently for the operator. With valve 55 in the position of Fig. 3 fluid pressure for valve 44 is cut off from conduit 49 and must be supplied by conduit 94 through the power distributing member. Since the only other supply of pressure to motor 26 is by way of valve 45, and since this valve cannot be operated until the bed has moved to registering position and started upward, the press cannot be closed except when pressure is supplied in conduit 94 by rotary valve 90, even though the bed were moved to registering position by hand. Note also that when pressure is supplied through conduit 94 the press will not close until the operator pulls control handle 71.

In tandem operation the press may be opened by actuation of pilot valve 46 the same as before. This may occur through the emergency timer mechanism, if the power distributing member fails to open the press within the set period, or it may occur by operator actuation of guard 86 if she desires to rearrange the lay of the work, or by accidental movement of finger guard 86. However, in tandem operation conduit 95, which is directly connected into cylinder 47, will ordinarily open the press when fluid is supplied through valve 90.

The tandem operation of two presses will now be described referring to the fully illustrated and described press as press A and to the second press as press B. With the parts of press A in the position of Fig. 1 and press B as in Fig. 2, and assuming that valve 90 has just rotated into the position of Figs. 3 and 4, passageway 93 of the rotary valve registers with port OB and fluid pressure flows from conduit 91 through conduit 95a to release cylinder 47a of press B and opens that press. Press A has been open for half a revolution of valve 90 and normally the operator has had time to remove an ironed workpiece from bed 24 and to arrange an unironed workpiece thereon. She then pulls handle 71 and fluid pressure flows through conduit 91, passageway 92, port CA, conduit 94, valve 55, valve 44, chamber 57 and conduit 58 to motor 26 to close press A. The purpose of extending valve passageway 92 some distance about the circumference of the valve core is to provide pressure supply to the press motor long enough to move the bed into registration and trip the final pressure inlet valve so that the press will close completely. Note in Fig. 4 that the core of valve 90 rotates in a clockwise direction and that the leading edge of port 92 coincides with port CA in the valve casing when port 93 registers with port OB.

The power distributing member thus normally opens the press a predetermined time after it is closed. The timing may be altered by varying the speed of motor 96 or by changing the gearing of unit 97, or in any other suitable manner.

The operator cannot get in trouble when using the above described tandem control. If she is slow in arranging the work on press A the rotary valve will open press B and, both cam shafts 70 and 70a being in press-opening position, rotary valve 90 will stop with the leading edge of port 92 in registration with port CA. When the operator is ready she pulls handle 71 and press A closes. If the operator is fast in arranging work on press A and pulls handle 71 before rotary valve 90 reaches the position of Figs. 3 and 4, nothing will happen at press A but, both cam shafts being in press-closing position, rotary valve 90 will stop. The emergency timer of press B is then relied upon to open that press, whereupon valve 90 will continue its rotation and close press A.

Ordinarily the power distributing member will act as a timer while also insuring alternate operation of two presses. The emergency timer will be set to operate after a period slightly longer than that set on the power distributing member. The emergency timer is thus largely a safety device to insure against a press remaining closed long enough to cause damage to work or to the press padding.

By use of my improved control mechanism one press is opened substantially simultaneously with the closing of another, which is known as tandem operation, but in the usual tandem connection if the operator is slow in closing one press, work on the other press may be damaged by too long subjection to heat. The power distributing member opens the second machine at the proper time and sets the first machine to close subject to the will of the operator.

Figure 13:
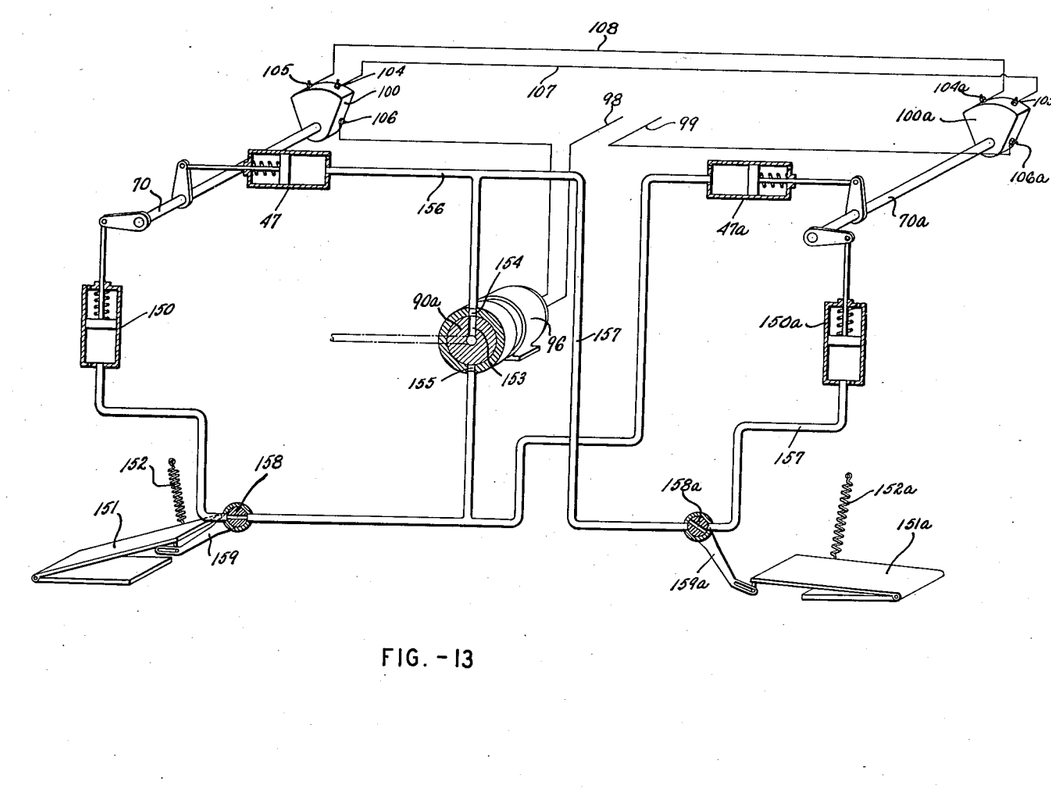
Fig. 13 is a diagrammatic view of a modified control system.

Fig. 13 is a modification shown diagrammatically. The control system shown here is used in connection with presses of the type illustrated and described in Figs. 1 to 12. The rotary valve 90a is similar in all respects to the valve 90 and is rotated by a motor having alternate operating circuits controlled by switches 100 and 100a positioned on shafts 70 and 70a as above described. In the diagram each of the presses, A and B, is provided with a release relay 47, 47a for moving cam shaft 70, 70a in counter-clockwise direction to open the press as previously described. An additional closing relay 150, 150a is added in this modification and is adapted, when supplied with fluid pressure, to rotate the valve-operating cam shaft 70, 70a in clockwise or press-closing direction. Valve 90a is provided with one port 153 in the core which alternately registers, during its rotating cycle, with ports 154 and 155 in the casing. Port 154 supplies fluid through conduit 156 to the release relay of press A and through conduit 157 supplies fluid to the press-closing relay 150a of press B. In a similar manner, port 155 supplies fluid to the release relay 47a of press B and to the closing relay 150 of press A. The above construction replaces conduits 94 and 95 of Figs. 3 and 4 and valve 55 would be in the position of Fig. 12, or the arrangements of passageways would be equivalent to that.

An additional valve 158, 158a is provided in the conduit leading to the closing relay of each press. This valve is held in position to close said conduit by the body of the operator when standing before the press. The embodiment shows a treadle 151 biased upwardly by a spring 152. An operative connection 159 holds valve 158 in conduit-closing position when the operator stands on treadle 151 to arrange the work. When the operator steps off the treadle, spring 152 opens valve 158.

The operation of the mechanism of Fig. 13 is as follows:

The operator having left press A closed is now at open press B standing on treadle 151a. Valve 90 rotates to register port 153 in the core with port 154 in the casing. Fluid travels through conduit 156 to release relay 47 and opens press A. Pressure is also supplied to conduit 157 which leads to the closing relay of press B. This is prevented from operating by valve 158a which is closed by the operator's weight on treadle 151a. Both presses being now open cam shafts 70, 70a and switches 100 and 100a are in the same phase and motor 96 and valve 90 stops. When the operator finishes the lay on press B, she simply walks away. Spring 152a raises treadle 151a which opens valve 158a. Pressure actuates closing relay 150a to move cam shaft 70a in press-closing direction. Press A being open and press B closed, valve 90 again starts to rotate. When valve port 153 reaches port 155 the situation is the same as before with the presses reversed. The treadle 151 thus prevents the press closing until the operator is ready.

Figure 14:
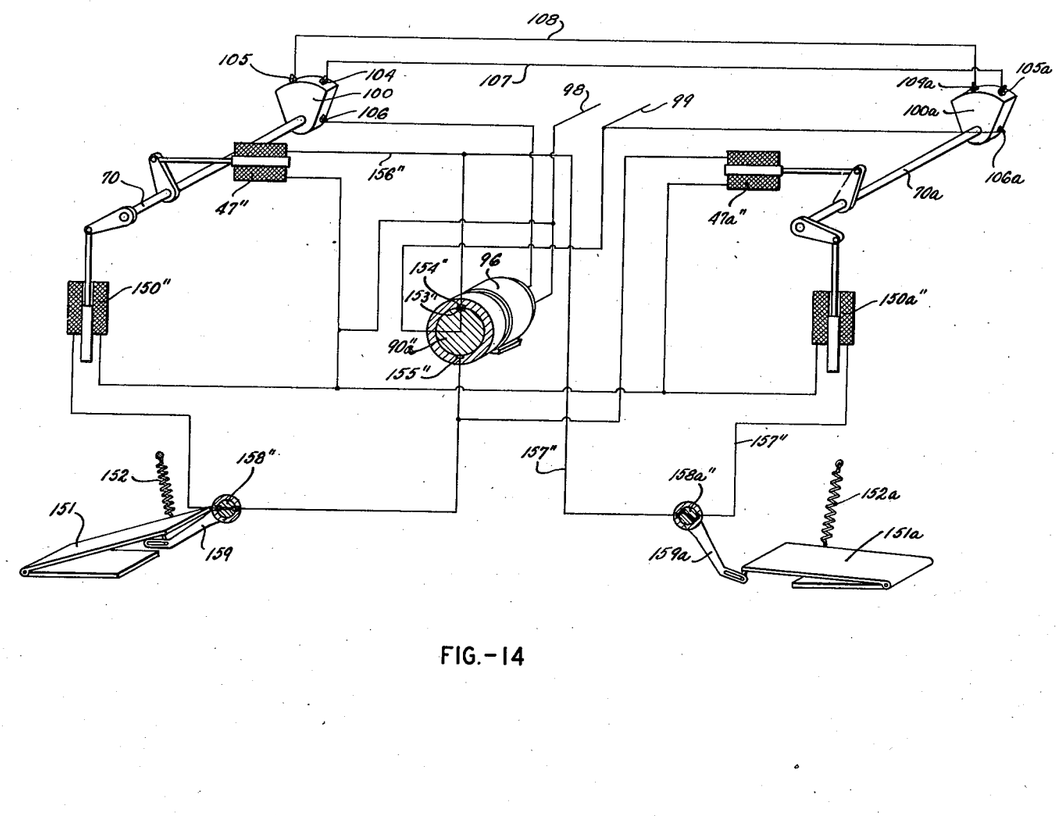

My invention is not confined to the means illustrated but includes equivalent means for accomplishing the same result. For instance, the arrangement of Fig. 13 might be duplicated electrically. In such an electrical system, valve 90a would become a rotary switch or commutator, the conduits would be electrical conductors, the relays might be solenoids, and valves 158, 158a would be make-and-break switches. Such an arrangement is shown in Fig. 14 where exactly similar parts have the same reference characters as in Fig. 13 and analogous parts have the same reference characters with the addition of a "double-prime" suffix. The system of Fig. 14 acts in all respects like the system of Fig. 13.

What I claim is:

1. In combination two machines; each having an active and an inactive position, power operated means for causing machine-active movement, power operated means for causing machine-inactive movement, and a synchronizing member having operative connections with at least one of said power means whereby said member has a machine-active position and a machine-inactive position; a power distributing member, power circuits connecting said distributing member with each of said power means, said distributing member having two positions adapted alternately to energize the machine-active-producing circuit of each machine and the machine-inactive-producing circuit of the other machine, means for continuously moving said distributing member alternately from one of its two positions to the other, and means automatically interrupting the movement of said distributing member when both synchronizing members are in machine-active, or both in machine-inactive, position.

2. In combination two presses; each having relatively movable pressing members, power operated press opening means, power operated press closing means, and a synchronizing member having operative connections with at least one of said power operated means whereby said synchronizing member has a press-open position and a press-closed position; a power distributing member, power circuits connecting said distributing member with each of said power operated means, said distributing member having two positions adapted alternately to energize the press closing circuit of each press and simultaneously to energize the press opening circuit of the other press, means for continuously moving said distributing member alternately from one of its two positions to the other, and means automatically interrupting the movement of said distributing member when both synchronizing members are in press-open, or both in press-closed, position.

3. In combination two presses; each having relatively movable pressing members, power operated press opening means, power operated press closing means, a synchronizing member having operative connections with at least one of said power operated means whereby said synchronizing member has a press-open position and a press-closed position, and a timer mechanism with connections for opening the press a predetermined time after the press closes; a power distributing member, power circuits connecting said distributing member with each of said means, said distributing member having two positions adapted alternately to energize the press closing circuit of each press and simultaneously to energize the press opening circuit of the other press, means for continuously moving said distributing member alternately from one of its two positions to the other, the said timer mechanism being set for a predetermined time longer than the time required to move said distributing member from one of its positions to the other, and means automatically interrupting the movement of said distributing member when both synchronizing members are in press-open, or both in press-closed, position.

4. In combination two presses; each having relatively movable pressing members, power operated press opening means, power operated press closing means, control members for each of said means, actuators for said control members mounted on a common shaft, said shaft having a press-opening-producing position and a press-closing-producing position, and electrical contacts closed by movement of said shaft into each of its positions; a rotary power distributing member, power circuits connecting said distributing member with the press-opening means of each press, a power circuit including one of said control members connecting said distributing member with the press-closing means of each press, said distributing member having two circuit-energizing positions, each position energizing the press closing circuit of one press and the press opening circuit of the other press, an electric motor for rotating said distributing member, and two power supply circuits for said motor, each supply circuit including in series the electrical contacts closed by movement of one shaft into press-opening-producing position and the contacts closed by movement of the other shaft into press-closing-producing position.

5. In combination two presses; each having relatively movable pressing members, press opening means, fluid pressure actuated press closing means, control valves for said closing means, actuators for said control valves mounted on a shaft, said shaft having a press-opening-producing position and a press-closing-producing position, manual means for moving said shaft to press-closing-producing position, fluid pressure actuated release means for moving said shaft to press-opening-producing position, and electrical contacts closed by movement of said shaft into each of its positions; a rotary valve having fluid passages therein, a source of fluid supply for said rotary valve, conduits controlled by said valves and connecting said rotary valve passages with the closing means of each press, other conduits connecting said rotary valve passages with the release means of each press, said rotary valve having two positions for supplying fluid under pressure to the press closing conduit for each press alternately and simultaneously to the release means conduit for the other press, an electric motor for rotating said rotary valve, and two power supply circuits for said motor, each supply circuit including in series the electrical contacts closed by movement of one shaft into press-opening-producing position and the contacts closed by movement of the other shaft into press-closing-producing position.

6. In combination two presses; each having relatively movable pressing members, power operated press opening means, power operated press closing means, and a synchronizing member having operative connections with at least one of said power operated means whereby said synchronizing member has a press-open position and a press-closed position; a power distributing member, power circuits connecting said distributing member with each of said means, said distributing member having two positions for alternately energizing the press closing circuit of each press and the press opening circuit of the other press, means for continuously moving said distributing member alternately from one of its two positions to the other; each press having a circuit interrupting device in its closing circuit, a treadle in position adapted to be depressed by an operator standing by the press, a connection between said treadle and interrupting device adapted upon treadle depression to close the corresponding circuit, and means normally biasing the treadle upward to thereby move the device to open its circuit; and means automatically interrupting the movement of said distributing member when both synchronizing members are in press-open, or both in press-closed, position.

7. In combination a plurality of presses; each having cooperating relatively movable pressing members, fluid pressure actuated power means for causing relative movement of said members, a source of fluid supply for operating said power means, and means on each press controlling the flow of fluid to said power means from said source; a fluid distributing member, conduit means for each press connecting said distributing member with the control means of each press, and a valve in each of said conduit means having alternative positions adapted to connect said control means with said source or with said distributing member.

8. In combination a plurality of presses; each having relatively movable pressing members and power operated press actuating means; a power distributing member, power circuits connecting said distributing member with each of said means, said distributing member having positions adapted to energize said power circuits in sequence, and means for moving said distributing member into its various positions.

9. Two presses in combination as in claim 2, and including operator-operated means for delaying the energization of the press closing circuit of each press.

10. Two presses in combination as in claim 2, and including means operable by the operator in working position at each press for delaying the energization of the press closing circuit of that press.

11. In combination two presses, each having a pair of cooperating relatively movable pressing members, power means at each press for causing closing and opening thereof, a distributing member, power circuits connecting said distributing member with each of said power means, said distributing member being movable into two positions for alternately supplying power to each of said circuits, motor means for continuously moving said distributing member alternately from one of its positions to the other, and means operatively connected with the parts of each press and with said motor means for automatically interrupting the action of said motor means when both presses are closed and when both presses are open.

12. In a pressing machine, coacting pressing members, power means for causing closing of the pressing members, a power supply circuit for said means, a power distributing member for supplying power to said power circuit in timed relation to the supply of power to another machine, a control member in said circuit biased toward power supply position, and means for holding said control member in power interrupting position by an operator in working position at the press.

13. In combination two presses, each having coacting pressing members, power means at each press for causing closing and opening of the pressing members thereof, control means for each power means, each control means having a press-closing-producing position and a press-opening-producing position, continuously operating means for supplying power alternately to the power means of each press, and means operated by movement of both control means into press-closing-producing position or by movement of both control means into press-opening-producing position for interrupting said continuously operating means.

14. In combination two presses, each having coacting pressing members, power means at each press for causing closing and opening of the pressing members thereof, control means for each power means, each control means having a press-closing-producing position and a press-opening-producing position, each control means having two power devices operatively connected therewith for moving said control means into press-opening- and into press-closing-producing position respectively, and continuously operating means for supplying power alternately to the press-opening-producing power device of each press and for simultaneously supplying power to the press-closing-producing power device of the other press.

15. The combination of claim 14 including means for interrupting the operation of said continuously operating means upon movement of both power devices into press-opening-producing or into press-closing-producing position.

16. In a pressing machine, coacting pressing members, fluid actuated power means for opening and closing the press, two sources of fluid supply for said power means, one source locally controlled and one source remotely controlled, and a valve movable into two positions and adapted to stay in either position until again moved, said valve having passages adapted to connect said power means alternatively with each supply source as said valve is moved from one of its two positions to the other.

GEORGE S. BALDWIN.